June 11, 1968     O. WALKER     3,387,488
DEVICE FOR DETECTING A LEAK OR INJURY TO A PNEUMATIC TIRE
Filed Sept. 7, 1967     4 Sheets-Sheet 1
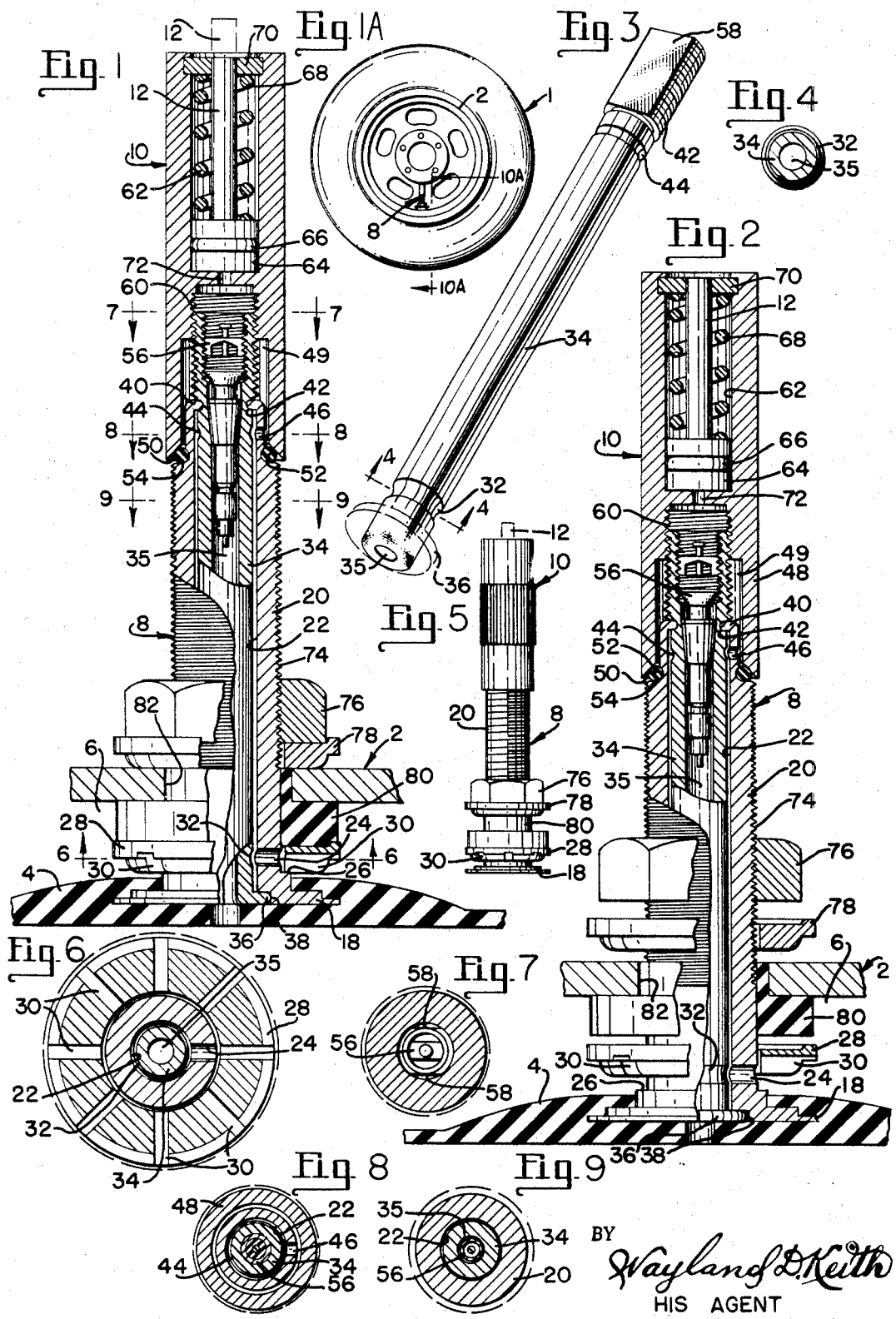
BY *Wayland D. Keith*
HIS AGENT

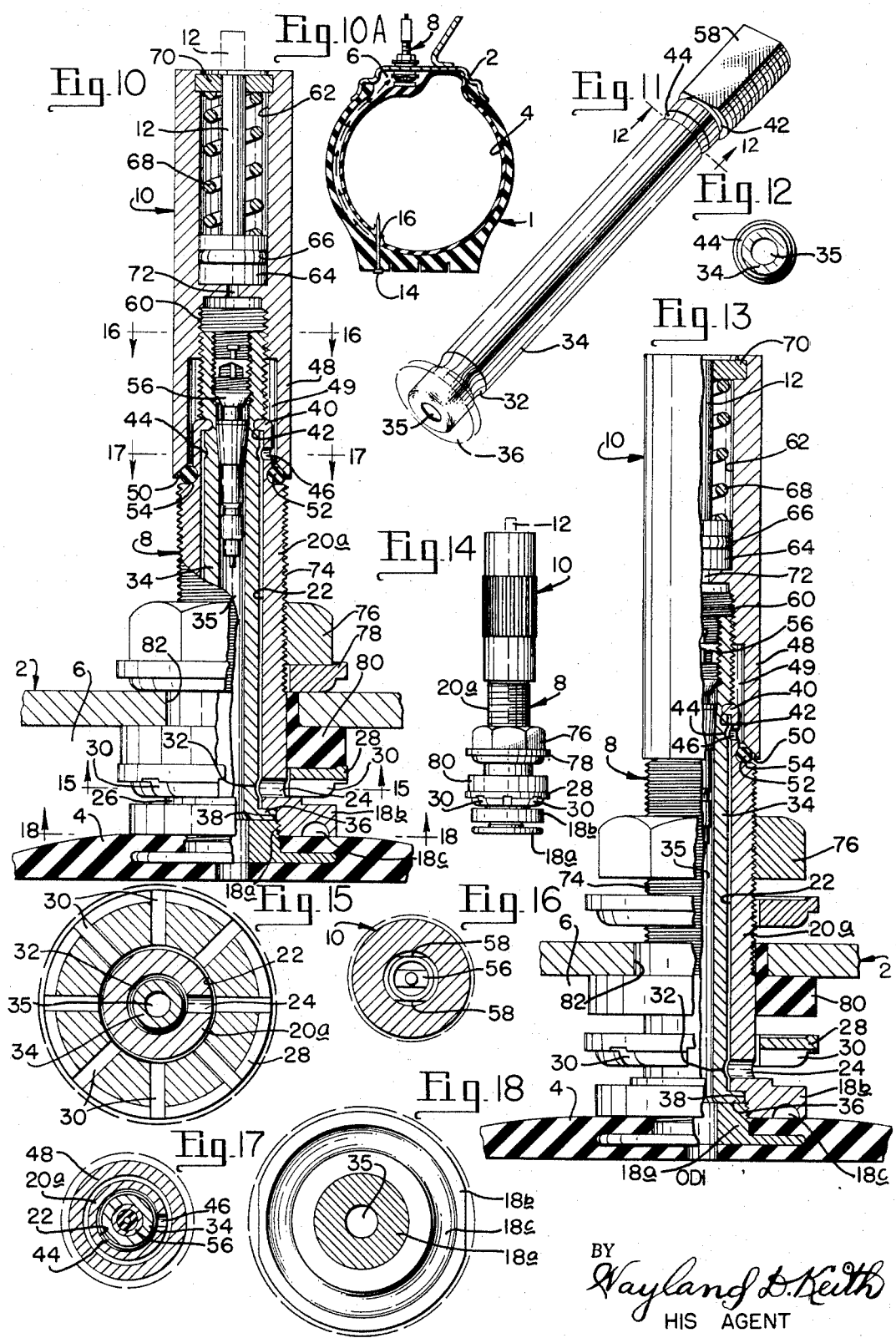

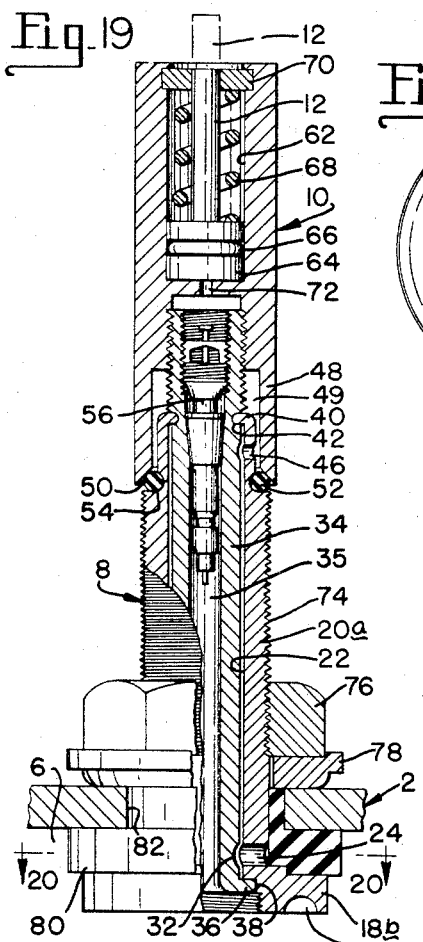
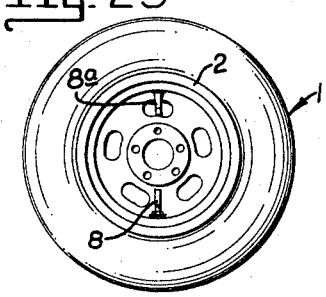
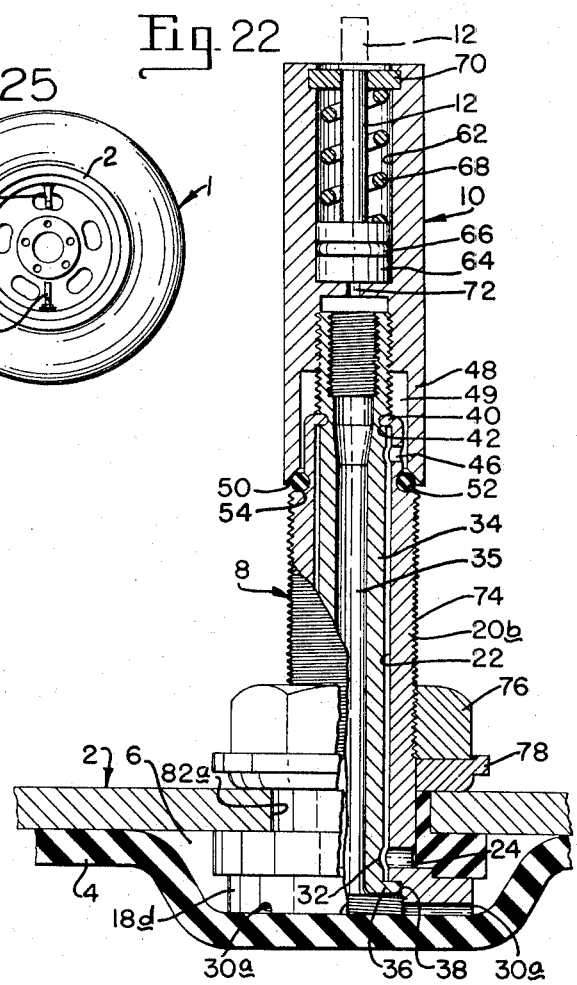
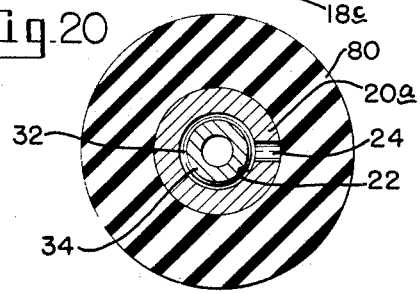
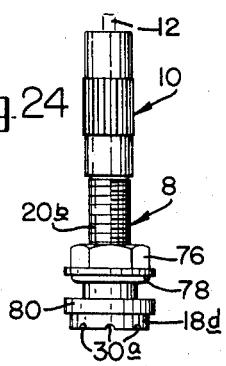
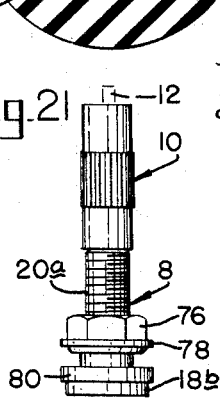
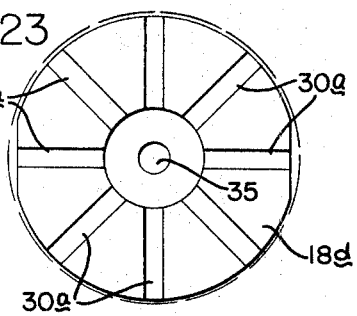
ODIS WALKER
INVENTOR.
BY Wayland D. Keith
HIS AGENT

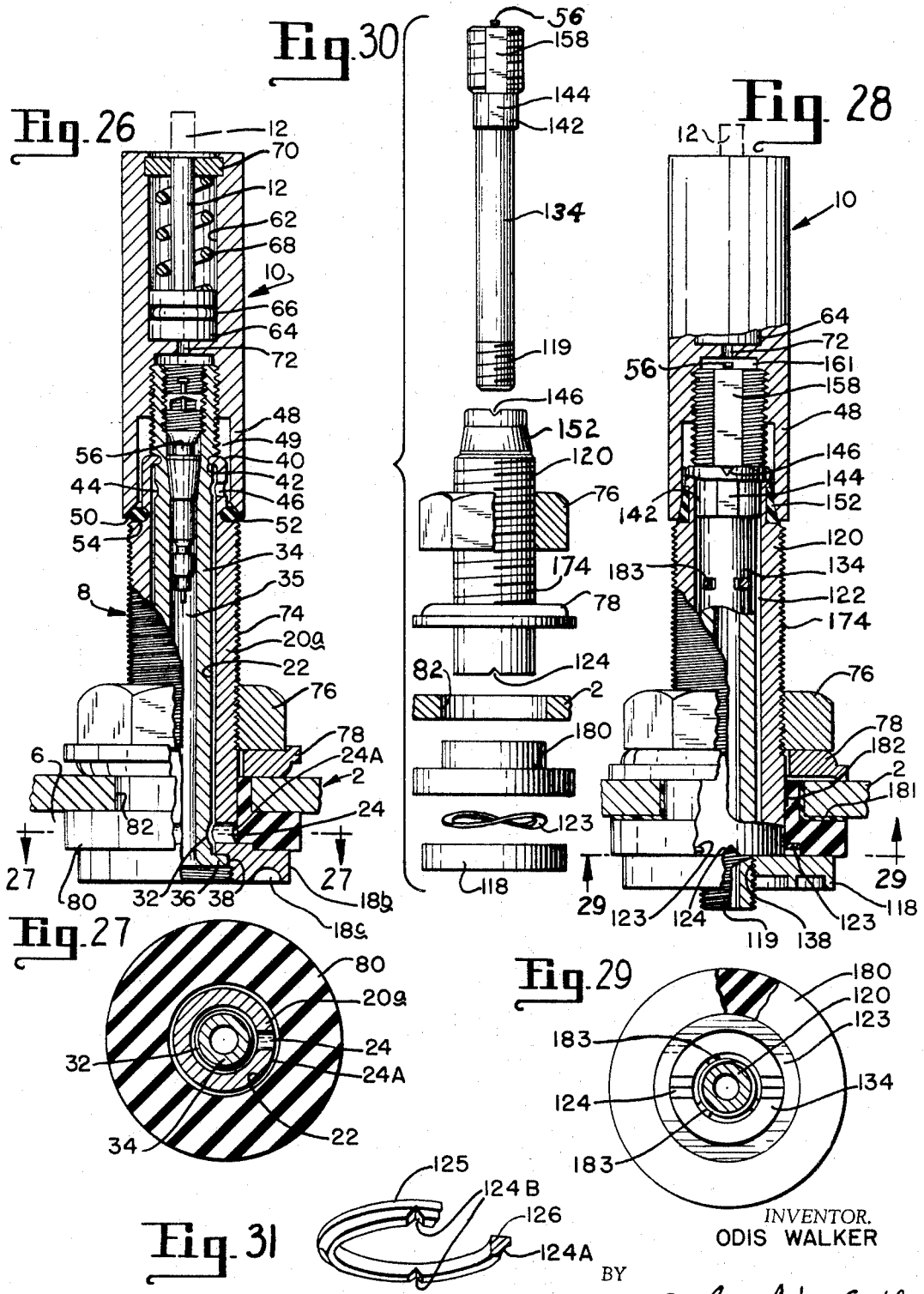

United States Patent Office 3,387,488
Patented June 11, 1968

3,387,488
DEVICE FOR DETECTING A LEAK OR INJURY TO A PNEUMATIC TIRE
Odis Walker, 4017 Brookview Road, Austin, Tex. 78722
Continuation-in-part of application Ser. No. 455,761, May 14, 1965. This application Sept. 7, 1967, Ser. No. 671,912
18 Claims. (Cl. 73—49)

ABSTRACT OF THE DISCLOSURE

A leak and injury indicator of a pneumatic tire of a tire and rim assembly, which is preferably incorporated into and used in conjunction with a valve stem, one conduit of which valve stem connects with the tire cavity within the tire exterior of an air tube or envelope therein, the other conduit of which valve stem is in fluid communication with the air envelope. An air pressure indicator is associated with the conduit which connects with the tire cavity within the tire, exterior of the air envelope to indicate a rise in pressure in the tire cavity, without permitting air to escape. The leak and injury indicator can also be used with tubeless tires to indicate the possibility of an air leak between the valve stem and the rubber grommet which is fitted within a hole in the rim.

Specification

This application is a continuation-in-part of my application Ser. No. 455,761, a Device for Detecting a Leak or Injury to a Pneumatic Tire, filed May 14, 1965, which last mentioned application was co-pending with my application Ser. No. 310,719, filed Sept. 23, 1963, for Tire Valve Assembly and Air Leak Indicator for Pneumatic Tires Which Utilize Inner Tubes, now Patent No. 3,185,126.

This invention relates to a device for detecting a leak or an injury to a pneumatic tire, and more particularly to a leak and injury detector used with modern tires and rims, between which tires and rims an air-tight seal is normally formed, except for a hole in the rim which normally has a valve stem extending therethrough. In the so-called tubeless tire, the valve stem is supposed to make an air-tight seal with the rim to prevent the escape of air from the cavity within the tire. In the type of tire which uses an air-tight envelope there, a valve stem is connected in fluid communication with such envelope so as to enable the inflation of the tire, however, heretofore, the stem did not necessarily form a fluid tight seal to close said hole.

With modern tires and rims made with such air-tight construction, air envelopes need not be of such heavy construction as to hold the air in the tire, as the tire is normally air-tight with the rim and it is a matter of retaining the air against leakage from the tire cavity in event that the tire becomes bruised or punctured. It is however, desirable to ascertain such injury or puncture prior to the tire becoming flat. It is to this end that the present invention is designed.

In the penetration of a tire by an object such as a nail or the like, the object usually remains in the tire and goes undetected until such penetrating object works loose, which is usually while the vehicle is operating at high speeds, causing emergency tire failure and damage to the tire. However, with the present device, the air leak may usually be detected well in advance of the failure. The present leak and injury detector is disclosed in several different forms so as to be applicable to a wide variety of needs. It may either be in the form for use in combination with a valve stem or to be used independently of the valve stem, in accordance with the specific application.

An impact between a tire and a foreign object bruises the tread and/or the cords of the tire, which causes the separation of the cords thereby to chafe or abrade a hole in the tire envelope which will cause the air to escape therefrom. However many times, a hole through the tire at the point of bruise does not exist, but upon continued use of the bruised tire, an abraded hole will be worn in the envelope which will permit the air to escape into the tire cavity exterior of the envelope, whereupon it will find its way to a hole in the rim, if such hole is not sealed, and outward therethrough to deflate the tire. Such injury usually results in a minor leak to start with, which will instantly show on the leak and injury detector prior to the failure; however, if such bruise goes unattended, it is a common cause of dangerous blowouts or tire failures.

Various signal indicators for motorists have been proposed heretofore, however, these for the most part, were so connected to the tire valve that when a tire became low, a low pressure whistle would be activated by the air in the tire, which would use the remaining air to sound such alarm, thereby depleting the air from the envelope even though it might have been sufficient to travel to a service station or the like.

The present device is so constructed as to seal the tire cavity exterior of the air envelope to prevent the air from leaking out of the tire cavity at the tire valve hole or other hole therein, which would be the normal avenue of escape, and at the same time, a signal, is actuated by air escaping into the tire cavity to indicate a puncture or bruise on the tire, without loss of air from the tire cavity.

An object of this invention is to provide an air leak and tire injury detector for a pneumatic tire which will indicate the loss of air from an air envelope into the tire cavity.

Another object of the invention is to provide a leak and injury detector for use with a tire having an air envelope therein, which will readily detect an injury to a tire sufficient to cause leakage from an air envelope.

Still another object of the invention is to provide a leak and injury detector for a tire which may be incorporated into and used in conjunction with a valve stem, whereby the leak and injury detector and valve stem are sealed in air-tight relation against leakage therefrom.

Still another object of the invention is to provide a leak and injury detector that may be readily installed in an independent hole, within the rim, to enable a tube and valve stem to be used in a somewhat conventional manner, with the tube sealing the normal valve stem hole and the leak and injury detector sealing a hole within the rim through which it projects so as to indicate the presence of air in the tire cavity exterior of the air envelope.

Still another object of the invention is to provide a leak and injury detector for a tire and the envelope therein, which will detect leaks in tire valves simultaneously with a puncture or bruise, but with the tire valve being testable independent of the tire cavity.

Still a further object of the invention is to provide a tire leak and injury detector that may be readily modified for use in rims using tubeless tires, and which may be made so that the valve may be removed and replaced without injury thereto.

While five forms of the invention, particularly the uses thereof under different conditions, have been illustrated in the accompanying drawings, it is to be pointed out that the basic invention is substantially the same for all forms with only certain parts being changed to adapt the device to the particular environment in which it is used.

With these objects in mind, and others which will become evident as the description proceeds, reference is to be had to the accompanying drawings in which like reference characters designate like parts in the several views thereof, in which:

FIG. 1 is an elevational view of an air leak and tire injury detector on an enlarged scale employing an air retaining device or safety indicator, with parts broken away and shown in section to bring out the details of construction and with an indicator pin being shown extended outward therefrom in dashed outline, which is the position to indicate the presence of a leak of the air envelope into the tire cavity;

FIG. 1A is an elevational view of a tire mounted on a rim of a wheel and showing an air leak and tire injury detector thereon;

FIG. 2 is a view similar to FIG. 1, but showing certain of the parts in exploded relation to show the relation therebetween;

FIG. 3 is a view of the inner valve tube in perspective, showing the tube before the flanging thereof, but showing the flange portion in dashed outline;

FIG. 4 is a sectional view taken on line 4—4 of FIG. 3, looking in the direction indicated by the arrows;

FIG. 5 is an elevational view of the tire leak and injury detector shown apart from the tube and the rim, and showing, in dashed outline, an indicator pin in extended position to indicate a leak;

FIG. 6 is a sectional view taken on line 6—6 of FIG. 1, looking in the direction indicated by the arrows;

FIG. 7 is a sectional view taken on line 7—7 of FIG. 1, looking in the direction indicated by the arrows;

FIG. 8 is a sectional view taken on line 8—8 of FIG. 1, looking in the direction indicated by the arrows;

FIG. 9 is a sectional view taken on line 9—9 of FIG. 1, looking in the direction indicated by the arrows;

FIG. 10 is a view similar to FIG. 1, but showing an alternate form of the invention attached to a tube having a spud extending outward therefrom;

FIG. 10A is a sectional view taken on the line 10A—10A of FIG. 1A looking in the direction as indicated by the arrows;

FIG. 11 is a view similar to FIG. 3, but of the alternate form of the invention;

FIG. 12 is a sectional view taken on line 12—12 of FIG. 3, looking in the direction indicated by the arrows;

FIG. 13 is a view similar to FIG. 2, but of the alternate form of the invention;

FIG. 14 is an elevational view of the alternate form of invention, showing, in dashed outline, a leak indicator pin extending therefrom, which view is approximately normal size for conventional tires;

FIG. 15 is a sectional view taken on line 15—15 of FIG. 10, looking in the direction indicated by the arrows;

FIG. 16 is a sectional view taken on line 16—16 of FIG. 10, looking in the direction indicated by the arrows;

FIG. 17 is a sectional view taken on line 17—17 of FIG. 10, looking in the direction indicated by the arrows;

FIG. 18 is a sectional view taken on line 18—18 of FIG. 10, looking in the direction indicated by the arrows;

FIG. 19 is an elevational view of a portion of the tire leak and injury indicator as shown in FIG. 10, but shown apart from a conventional air envelope spud, shown as adapted and used in a hole in a rim of a conventional tubeless tire, and showing the manner of sealing the tire cavity in air-tight relation, while permitting the air to be introduced through a valve stem with an air leak indicator thereon, which will indicate the possibility of an air leak between the seal and the valve stem;

FIG. 20 is a sectional view taken on the line 20—20 of FIG. 19, looking in the direction indicated by the arrows;

FIG. 21 is an elevational view of the tire leak and injury indicator, an air retaining device or safety indicator being shown on a reduced scale;

FIG. 22 is a view similar to the form of the invention as shown in FIG. 10, but of a slightly modified form, to enable the use thereof in a rim of a tire having an air envelope therein, which device is independent of the tire valve, but which will record the presence of air pressure in the tire cavity exterior of the air envelope, and showing the stem of the indicator device in sealed relation with the rim, and showing a portion of the air envelope in cross section;

FIG. 23 is a bottom plan view of the base of the fourth form of the invention;

FIG. 24 is an elevational view of the indicator device removed from the rim, with the device being shown on a reduced scale;

FIG. 25 is an elevational view of a tire mounted on a wheel, showing a valve stem extending outward from the regular tube, which valve stem is in sealed relation with the rim of the tire, and showing a leak detector and tube injury detector, as shown in FIG. 22, mounted in the rim;

FIG. 26 is a view similar to FIG. 19, but shows more clearly how any air which passes beneath the grommet, which grommet normally seals the hole between the rim and the valve stem of a tubeless tire, will direct the air through passages which are in fluid communication with a leak indicator;

FIG. 27 is a sectional view taken on the line 27—27 of FIG. 26, looking in the direction indicated by the arrows;

FIG. 28 is a view similar to FIG. 26, but of a further modified form of the invention;

FIG. 29 is a sectional view taken on the line 29—29 of FIG. 28, looking in the direction indicated by the arrows;

FIG. 30 is an exploded view, on a reduced scale, of the valve stem parts as shown in FIG. 28, and showing a portion of the rim associated therewith; and FIG. 31 is a perspective view, on an enlarged scale, with parts broken away and shown in section, of an air diverting ring to be used beneath the grommet to direct any air leaking thereunder into a passage which leads to a leak indicator.

With more detailed reference to the drawings the numeral 1 indicates generally a tire which is fitted on a rim 2 in normal air-tight relation, with an air cavity 6 located between an air envelope 4 and said tire 1. A tire leak and injury detector generally designated by the numeral 8 extends through rim 2 and is in air-tight relation with respect thereto, which detector has an indicator cap 10 thereon which cap has a cavity therein to receive a piston 64, to which piston is attached an indicator pin 12 adapted to extend outward therefrom when pressure is applied thereto. A piston 64 is in fluid communication with air cavity 6, which air cavity 6 is between the envelope 4 and the tire 1. An indicator pin 12 is associated with piston 64 to indicate the presence of air pressure within cavity 6, due to movement of piston 64. Air is released from cavity 6 by the envelope 4 becoming pierced, as by a foreign object 14. Therefore, with air escaping through hole 16 in envelope 4, pressure is exerted on piston 64 in indicator cap 10, which will cause pin 12 to extend from indicator cap 10.

With more specific reference to the form of the invention as shown in FIGS. 1 through 9, the air envelope 4 has the base 18 of the tire leak and injury detector 8 embedded therein, and bonded thereto, as will best be seen in FIGS. 1 and 2. A rigid outer conduit or tubular member 20 is preferably made integral the base 18 and extends outward therefrom, which tube has a bore 22 therein, which bore is adapted to receive a tubular member or inner conduit 34, therein, so as to form an annular space therebetween. A transverse hole 24 passes through the tube 20 a spaced distance above the base 18 and in close proximity thereto. It is preferable to have a shoulder 26 immediately below the transverse hole 24 to support a grooved washer 28 thereon, as will best be seen in FIG. 1. The grooves 30, in grooved washer 28, are in communication with the tire cavity 6 intermediate the air envelope 4 and the rim 2, so that air under pressure, which accumulates within the cavity 6, will flow between the casing 1 and the air envelope 4 to the grooved washer 28 near the rim 2, thence through grooves 30 into and through transverse hole 24 and into the bore 22 of tubular member 20, which has an annular groove 32 therein.

An inner tubular member or conduit 34 extends downward through tubular member 20 and is of such length that it may be swaged outward to form a flange 36 to seal a complementary counter-bore 38 in base 18 in air-tight relation, with the bore 22 between the outer diameter of the tubular member 34 and the inner diameter of tubular member 20 forming an annular air passage therebetween. The upper end of tubular member 20 is inturned, as indicated at 40, to fit an annular groove 42 near the upper end of inner tubular member 34 so as to join the tubular member 34 to the outer conduit or outer tubular member 20 to hold the two tubes in coaxial relation, however, the joining of these tubes at this juncture need not be air-tight.

The inner tubular member or conduit 34 has an annular groove 44 therearound near the upper end thereof. The annular groove 44 is adjacent a hole 46 in the outer tubular member 20, so that the air passing upward through the annular space 22 will pass out through hole 46 into the lower end of the skirt 48 of indicator cap 10. The skirt 48 is beveled, as indicated at 50, on the lower end thereof, so as to form a complementary seal with O-ring gasket 52 which is fitted within an annular groove 54 in tubular member 20 so as to prevent air from escaping out of the lower end of skirt 48.

The inner tubular member 34 is threaded interiorly at the upper end thereof, to receive a valve core 56. The exterior portion of the tubular member 34 is threaded exteriorly and has two sides thereof flattened as indicated at 58, to permit the passage of air along the flattened portion thereof and intermediate the threaded portion 60 of indicator cap 10.

The indicator cap 10 has a cylindrical bore 62 therein to receive a piston 64 on which is mounted a packing member or O-ring 66. The piston 64 is secured to the lower end of indicator pin 12 or is made integral therewith. A spring 68 surrounds indicator pin 12 and has one end thereof pressed against piston 64 and the other end thereof against an abutment 70 which is fitted in the upper end of indicator cap 10, with the end of the indicator 10 being roller thereover so as to maintain the abutment 70 in fixed relation thereto. A hole 72 is provided in indicator cap 10 intermediate the threaded portion 60 and the cylindrical bore 62 so as to permit air escaping from the cavity in the casing surrounding the air envelope to exert a pressure on the face of the piston 64.

The outer diameter of the rigid outer conduit or tubular member 20 is threaded, as indicated at 74, which threaded portion threadably receives a nut 76 thereon in binding engagement against a washer 78, which in turn binds against the upper face of the rim 2 to draw the outer conduit or tubular member 20 upward, and with the grooved washer 28 resting on shoulder 26, the washer urges an elastomer grommet 80 into binding engagement with the lower face of rim 2, and with a portion thereof extending up through hole 82 in rim 2. The grommet 80 forms an air-tight seal and retains any air within the cavity of the casing 1 which leaks from the air envelope 4.

With an air envelope 4 mounted in a casing 1, and inflated as indicated in FIGS. 1A and 10A, and with the indicator 10 fitted in place to form an air-tight seal with the outer conduit or outer tubular member 20, air will be retained therein. However, if the air envelope 4 becomes punctured, as indicated in FIG. 10A, the air will find a path to the base of the indicator 8, thence through grooves 30 into transverse hole 24, then upward through bore 22, around inner tubular member 34 and out through hole 46 into an annular space 49 in skirt 48, thence between flattened sides 58 of inner tubular member 34 and the threaded portion 60 of indicator cap 10, thence through hole 72 to react on the face of piston 64 to move the piston outward against compression of spring 68 so that the indicator pin will extend outward through the upper end of the apertured abutment 70, as indicated in dashed outline in FIGS. 1 and 5.

Second form of invention

The second form of the invention has the same component parts as the first form of the invention, except in this form of the invention the outer conduit or tubular member 20a has an outstanding flange 18b on the lower end thereof which is interiorly threaded to threadably receive a screw threaded spud 18a, which threads, when tightened, draw the flange 18b into binding engagement with elastomer air envelope 4. The flange 18b has an annular groove 18c therearound in order to form a seal with the air envelope 4. The relation of the air envelope 4 to the rim 2 is the same as in the aforementioned form of the invention and the grommet 80 seats on a grooved washer 28, which washer seats on a shoulder 26 so the air may pass therethrough in the same manner as set out for the form of the invention described above, with the numbers of this form of the invention corresponding, when applicable, to the first mentioned form.

Third form of invention

FIGS. 19, 20, and 21 show the outer tubular member 20a and flanged base 18b used in connection with a sealing grommet 80 in such manner as to prevent air escaping from the tire cavity, as the grommet 80 normally seals the transverse hole 24 in outer tubular member 20a when positioned as shown in FIG. 19, and with the grommet 80 normally sealing the hole within the rim, the leak and injury detector can be used as a permanent type valve and the leak indicator cap 10 may still be used to prevent the escape of any air out through the axial passage in inner tubular member or conduit 34, should the valve core leak. If the valve core should leak, the indicator pin 12 will so indicate in the same manner as in the form of the invention as previously set out.

In using the indicator in this manner as a permanent type valve for tubeless tires, the use of the grooved washer 28 is dispensed with; however, at any time it is desired to use air envelopes within the tire cavity, an air envelope with a screw threaded spud may be used, and by supplying the grooved washer 28 and arranging it in the manner as shown in FIG. 10, the tubeless tire valve stem may be immediately transformed back into a leak and injury detector for pneumatic tires. The indicator 10, as shown in FIG. 19, functions in the same manner as set out for the other forms of the invention.

While the grommet 80 normally seals transverse hole 24 in the outer tubular member 20a and the hole 82 in the rim 2, as shown in FIG. 19. The present injury indicator 8 is so constructed, FIG. 19, that air, leaking between the lower side of grommet 80 and the upper face of flange 18b, when the grommet 80 becomes loosened around the outer tubular member 20a, such air, under pressure, finds its way into transverse hole 24, as will best be seen in FIGS. 19 and 20, which air will then be directed from the tire cavity into the bore 22 of the outer conduit or tubular member 20a. This air leakage will cause indicator pin 12 to be moved outwardly to accurately determine that looseness is occurring between grommet 80 and the outer conduit or tubular member 20a.

Fourth form of invention

A slight modification is made in the form of the invention as shown in FIG. 19, so as to produce the form of the invention as shown in FIGS. 22 through 24, which shows a permanent type leak and injury detector 8. The base 18d is provided with radial grooves 30a, with an independent hole 82a formed in the rim, preferably opposite the regular valve stem 8a of the tire 1, FIG. 25. A tube 4, with a valve stem 8a therein, is of the type to form an air tight seal with the hole 82 in the rim, is utilized, which will enable the leak and injury detector 8 to be installed, as shown in FIGS. 22 and 25. The air envelope 4 is inflated, therefore, if a leak occurs therein, the air will find its way along the inner face of the rim and through grooves 30a in base 19d, thence into the axial opening 35 in inner tubular member 34. When the valve core is removed, as shown in FIG. 22, air will flow upward through hole 72 in indicator cap 10, and with the O-ring 50 forming a seal with the lower face of skirt 48 of indicator cap 10, the air will be self-contained, as the grommet 80 seals the hole 82a. The air pressure will pass upward through hole 72 to act upon the face of the piston 64 to move against tension of spring 68 to urge indicator pin 12 upward, as indicated in dashed outline in FIGS. 22 and 24.

The outer conduit or tubular member 20b is secured in place by a nut 76 threadably engaging screw threads 74 thereon. The nut will draw a washer 78 into binding engagement with the upper face of rim 2 and this compressive action will cause the grommet 80 to seal the hole 82a and the hole 24. This will permit the casing 1 and air envelope 4 to be removed from the rim 2 and replaced without disturbing the position of the leak and injury detector.

FIGS. 26 and 27 are substantially like FIGS. 19 and 20, respectively, except the air passage 24 in tubular member 20a, which extends between the exterior and interior thereof, has been more clearly disclosed to more definitely show that the transverse hole will conduct any air which finds its way beneath the grommet 80 and the upper face of flange 18, will find its way into the annular groove 24A in tubular member 20a, whereupon, the air will be conducted from annular groove 24A into and through air passage 24. Whereupon, air under pressure will pass into the bore 22 of outer tubular member 20a and thence along the outer diameter of inner tubular member 34 and out through hole 46 in outer tubular member 20a and will pass into the annular space 49 within indicator cap 48, thence between the flattened sides 58 of inner tubular member 34 to a chamber 61 above the valve core 56. The air within the chamber 61 will exert a pressure through hole 72 on piston 64 in the indicator cap 48 to cause indicator pin 12 to be projected outwardly, as indicated in dashed outline in FIG. 26.

It will be seen that upon the grommet 80, within perforation 82 in rim 2 becoming loose, the air will find its way between adjacent faces of grommet 80 and the flange 18b, whereupon, at least part of the air under pressure will pass into annular groove 24A, and thence into transverse hole 24 into bore 22 in tubular member 20a. In this manner, any air under pressure, which leaks into annular groove 24A will be diverted through passages to react upon piston 64 to move the indicator pin 12 to indicate a leak around the valve stem of a tubeless tire.

Fifth form of the invention

The fifth form of the invention is shown in FIGS. 28, 29 and 30, which construction enables the leak indicator device to be more readily assembled and disassembled, and to be positively held in assembled relation at all times, and which will perform the functions as set forth for the leak indicator devices as shown in FIGS. 19 and 26, for valve assemblies of tubeless tires.

The present leak indicator has a screw threaded base 118, which is screw threaded, as indicated at 138. The base 118 threadably receives a screw threaded end 119 of the inner tubular member 134 to form a rigid base. A grommet 180 is similar to grommet 80, except cement 181 is positioned intermediate the faces of grommet 180 and rim 2, so as to permanently seal the grommet against leakage between the grommet 180 and the rim 2. A further seal of cement 182 is preferably positioned within the hole in grommet 180, near the top thereof between the outer tubular member 120 and the grommet 180, to form an air tight bond therebetween.

The outer tubular member 120 is threaded and is adapted to receive a nut 76 thereon, so, when the nut is securely screwed down, it will bindingly engage a washer 78 to draw the base or nut 118 and the grommet 180 into binding, sealing engagement with the lower face of the rim 2, and to normally form a seal between the lower face of grommet 180 and the upper face of screw threaded base or nut 118, except at the area occupied by a spring metallic ring 123. However, in the assembly of the base or nut 118 on the screw threaded portion of outer tubular member 120, the spring metallic ring 123 is positioned to surround tubular member 120 immediately adjacent thereto and between the upper face of base or nut 118 and the lower face of grommet 180.

The spring metallic ring 123 is preferably deformed so as to be nonplanar, so that upon tightening the nut 76 on screw threads 74, the ring will yield some, but will tend to react on the grommet 180 to move it away from the base 118, if the grommet should become aged, deteriorated, and loosened prior to actual leakage of air therefrom, thereby making it possible to determine that the valve stem is becoming loose prior to loss of air, therefore, the elastomer grommet 180 will not be forced into air sealing relation around the outer tubular member 120 in the area covered by the spring metallic ring 123, but any air leaking between the lower face of grommet 180 and the upper face of flanged base or nut 118 between ring 123 and the outer diameter of grommet 180 will follow the space beneath the ring 123 until a transverse groove 124 is reached, which will direct the air inward into bore 122, then upward around the inner tubular member 134, whereupon, the air will pass through an air space between shouldered member 142 and past flattened faces 144. The air will then pass radially inwardly through grooves 146, in the upper end of inner tubular member 134 and upward through air passages 158 into a chamber 161 above the inner tubular member 134 to pass into axial opening 72 into indicator cap 10 to project pin 12 thereof outward, as indicated in dashed outline.

A tapered elastomer seal 152 is provided intermediate the outer tubular member 120 and the skirt 48, so, upon screwing cap 10 downward on screw threads on the upper end of inner tubular member 134, the cap will form an air tight seal with the upper end of the outer tubular member 120 to prevent the escape of air in the same manner as set out in the aforementioned forms of the invention. It is preferable to stabilize relative rotational movement between the inner tubular member 134 and the outer tubular member 120 by providing two or three spots of plastic cement 183 therebetween, which spots are circumferentially spaced apart so air will pass upward therebetween, but the tubular members 120 and 134 will be maintained in assembled relation, even though the base or nut 118 and the nut 76 are removed.

While a deformed metallic ring 123 has been shown as surrounding the outer tubular member 120 and as positioned between the upper face of the flange of base or nut 118 and the lower face of grommet 180, a metallic ring 125 may be positioned in the same relative arrangement, in lieu of the ring 123. The ring 125 has a circumferential groove 124A formed therearound which groove interconnects with transverse V-grooves 124B, so that when the grommet 180 seats upon the upper face 126 of the ring 125, a void will be present between the grommet and the upper face of the flange of base or nut 118, whereupon air, which leaks between the lower face of grommet 180 and the upper face of the flange of base or nut 118, will find its way into circumferential groove 124A, and since the upper face of grommet 180 is sealed by cement 181, the air will be diverted through grooves 124B which are in fluid communication with grooves 124 in the outer tubular member 120, which air will direct the air inward into bore 122 of outer tubular member 120, whereupon, the rest of the functions of the leak indicator will be the same as described for the above mentioned forms of the invention.

While the description has been broadly directed to an air envelope, it is to be understood that this includes the conventional type elastomer tube, which is made either of natural or synthetic rubber, but includes as well, an air envelope formed of plastic material, such as polyethylene film, vinyl or other plastics which range in thickness from two to twenty mils.

Having thus clearly shown and described the invention, what is claimed as new and desired to be secured by Letters Patent is:

1. A device for detecting leaks in the pneumatic tire of a tire and rim assembly and for determining injury to the tire thereof, which rim is perforate and which tire has an air envelope therein, which air envelope has an independent, self-contained air cavity therein, which device comprises;
   (a) a valve stem mounted on the air envelope,
      (1) said valve stem including an outer conduit and an inner conduit,
      (2) a seal formed between said outer conduit and said inner conduit, near the inner ends thereof,
      (3) said inner conduit being of a size to form an annular, air conducting space between the outer diameter thereof and the inner diameter of said outer conduit,
      (4) said outer conduit and said inner conduit being in interengaged relation, near the outer ends thereof, to maintain said conduits in lateral, spaced apart relation, substantially throughout the lengths thereof,
      (5) said annular air conducting space between said conduits being in fluid communication with the cavity of the tire exterior of the air envelope,
   (b) air pressure actuated indicator means mounted on the outer end of one of said conduits,
      (1) said outer conduit having a lateral air passage formed therein near the outer end thereof to interconnect said annular passage in said outer conduit and said air pressure indicator in fluid communication, to indicate the presence of air pressure in the tire cavity exterior of the air envelope,
      (2) said inner conduit being in fluid communication with said air envelope,
   (c) means forming a seal between the outer diameter of said outer conduit and the rim.

2. A device for detecting leaks in the pneumatic tire of a tire and rim assembly, as defined in claim 1; wherein
   (a) said inner conduit being flanged outwardly at the inner end thereof to hold said conduits in spaced apart relation and to form said seal between said conduits at the inner ends thereof, and
   (b) said interengaging relation between said outer and said inner conduits at the outer ends thereof being formed by said outer conduit being inturned to interengage said inner conduit.

3. A device for detecting leaks in the pneumatic tire of a tire and rim assembly, as defined in claim 2; wherein
   (a) an apertured, screw threaded spud,
      (1) a flange on said screw threaded spud, which flange is bonded to said air envelope and is in fluid communication therewith,
   (b) a screw threaded flange associated with the inner end of said outer conduit, which screw threaded flange is adapted to complementally and threadably engage said screw threaded spud in such a way that said inner conduit is in fluid communication with the air envelope.

4. A device for detecting leaks in the pneumatic tire of a tire and rim assembly, as defined in claim 1; wherein
   (a) a flange associated with the inner end of said outer conduit forms a base thereon, which base is bonded to said air envelope in such way that said inner conduit will be in fluid communication therewith.

5. A device for detecting leaks in the pneumatic tire of a tire and rim assembly as defined in claim 1; wherein
   (a) said outer conduit has a groove formed therearound near the upper end thereof,
      (1) an elastomer O-ring fitted within said groove and surrounding said outer conduit, and
   (b) said air pressure indicator means being adapted to form a seal with said O-ring when in one position.

6. A device for detecting leaks in the pneumatic tire of a tire and rim assembly, as delned in claim 5; wherein
   (a) said air pressure actuated indicator means is tubular in form and is adapted to threadably engage at least one of said conduits, and
   (b) the inner end of said air pressure actuated indicator means having an angular face formed thereon to fit in complementary sealing relation with said O-ring on said outer conduit.

7. A device for detecting leaks in a pneumatic tire of a substantially air tight tire and rim assembly, which rim is perforate, which detecting device comprises;
   (a) an air envelope within the pneumatic tire,
      (1) an outer conduit secured to said air envelope in sealed relation, which outer conduit extends outward from said air envelope and through said perforate rim,
      (2) a counterbore within said outer conduit adjacent said air envelope,
      (3) an inner conduit fitted within said counterbore in said outer conduit in air tight relation and extending through said outer conduit to extend beyond the terminal end thereof,
         (i) said inner conduit having an opening extending therethrough,
      (4) means between said outer conduit and said inner conduit to maintain said conduits in spaced, rigid relation for a least a portion of the length thereof to form an annular passage therebetween,
   (b) said outer conduit having a transverse passage formed therein near the lower end thereof exterior of said air envelope but within the tire cavity in said rim, which transverse passage is in fluid communication with the annular passage between said conduits,
   (c) said outer conduit having a hole formed therein near the upper end thereof, which hole is in fluid communication with the annular passage between said conduits,
   (d) a cap member extending over the ends of said conduits and forming a seal with said outer conduit inwardly from said last mentioned opening therein,
      (1) said cap member having a passage formed therein which is in fluid communication with said last mentioned opening in said outer conduit, which passage in said cap member is adapted to convey air under pressure between said cap member and said conduits to a point outwardly from the distal end of said inner conduit,
   (e) a pressure indicating means associated with said cap member, and
      (1) said opening in said cap member conducts air under pressure to said pressure indicating means to register the existence of pressure within said tire cavity exterior of said air envelope.

8. A device for detecting a leak in a pneumatic tire of a pneumatic tire and rim assembly, and for detecting injury thereto, the rim of which assembly is perforate and which pneumatic tire has a cavity therein, an air envelope within said tire cavity which has an independent, self-contained air cavity therein, which air leak indicator comprises;
 (a) a valve stem mounted on said air envelope and being in fluid communication therewith,
  (1) said valve stem including an outer conduit and an inner conduit,
  (2) said conduits extending through the perforate rim, with said outer conduit being in fluid communication with said cavity in said tire exterior of said air envelope,
   (i) elastomer means forming a seal between said outer conduit and the rim,
 (b) leak indicator means associated with said outer conduit for testing air pressure within said tire cavity independently of the air pressure in said air envelope, and
  (1) means sealing said indicator means in air tight relation with respect to said outer conduit leading to said tire cavity so that said indicator means indicates the presence of air pressure therein.

9. A device for detecting leaks in a pneumatic tire of a substantially air tight tire and perforate rim assembly, as defined in claim 7; wherein
 (a) said outer conduit has an outwardly extending flange on the inner end thereof,
 (b) said counterbore is screw threaded for a portion of the depth thereof,
 (c) said air envelope being adapted to have a screw threaded hollow spud therein, and
 (d) said screw threaded portion of said conduit adapted to threadably engage the screw threaded spud fitted within an air envelope.

10. A device for detecting leaks in the pneumatic tire of a substantially air tight tire and perforate rim assembly to indicate a leak from the air cavity in the tire, at the perforation in the rim, which device comprises;
 (a) a valve stem comprising an inner conduit and an outer conduit mounted on the perforate rim and extending through the perforation therein,
  (1) a valve member within said inner conduit of said valve stem,
  (2) said inner conduit being fitted within said outer conduit to form a passage therebetween,
 (b) a cap, having a cavity formed therein, which cap is positioned in sealed relation with respect to said outer conduit,
  (1) said outer conduit having a first lateral opening formed therein to connect the cavity of said cap in fluid communication with the passage between said inner and outer conduits,
 (c) an air pressure indicator associated with said cap and being in fluid communication with the cavity of said cap and the passage of said inner conduit,
 (d) said outer conduit having a second lateral opening formed therein below said rim,
 (e) an elastomer seal normally sealing the perforation between said outer conduit and the rim, and normally sealing said second lateral opening in said outer conduit into the cavity of the tire,
  (1) said second lateral opening adapted to pass air, under pressure, from said air cavity in the tire, into said passage between said conduits so as to be in fluid communication with said indicator, upon yielding or loosening of said elastomer seal with respect to said outer conduit, to indicate leakage of air thereby from said air cavity in the tire.

11. A device for detecting a leak at the perforation within the rim, from the air cavity of a substantially air tight tire and perforate rim assembly of a tubeless, pneumatic tire, which device comprises;
 (a) a valve stem comprising an inner tubular member and an outer tubular member mounted on the perforate rim and extending through the perforation therein,
  (1) a valve member within said inner tubular member of said valve stem,
  (2) said inner tubular member being fitted within said outer tubular member to form a passage therebetween,
   (i) a base on said inner tubular member,
 (b) a cap, having a cavity formed therein, which cap is positioned in sealed relation with respect to said outer tubular member,
  (1) said outer tubular member having a first lateral passage formed therein, which passage connects the cavity in said cap in fluid communication with the passage between said inner and outer tubular members,
  (2) said outer tubular member having a second lateral passage formed therein, within said tire cavity,
 (c) an air pressure indicator associated with said cap and being in fluid communication with said cavity therein,
  (1) said air pressure indicator being mounted on said inner tubular member and being responsive to air pressure within said cap,
 (d) an elastomer seal normally sealing the perforation between said outer tubular member and said rim,
  (1) said base and said elastomer seal being fitted together and having an annular passage located between adjacent faces of said base and said elastomer seal, and
  (2) said second lateral passage being connected in fluid communication with said passage formed between said inner tubular member and said outer tubular member, so air, under pressure passing between adjacent faces of said base and said elastomer seal, will be directed into the annular passage which is in fluid communication with said air pressure indicator, to actuate said air pressure indicator, to indicate a leak between the base of said inner tubular member and said adjacent face of said elastomer seal.

12. A device for detecting a leak at the perforation within the rim, from the tire cavity of a substantially air tight tire and perforate rim assembly of a tubeless, pneumatic tire, as defined in claim 11; wherein
 (a) said base is detachably connected to said inner tubular member, and
 (b) said second lateral passage comprises a lateral groove formed in the lower end of said outer tubular member, so as to form an opening which is in communication with said passage formed between said inner and outer tubular members, and with said annular passage which surrounds said outer tubular member, when the end of said outer tubular member is brought into binding engagement with the adjacent face of said base.

13. A device for detecting a leak at the perforation within the rim, from an air cavity of a substantially air tight tire and perforate rim assembly of a tubeless, pneumatic tire, as defined in claim 12; wherein
 (a) said detachable base is threaded to threadably engage said inner tubular member, which is threaded, and
 (b) a nut threadably engages said outer tubular member to draw said base into binding engagement with the adjacent face of said elastomer seal to normally form a seal between said base, said outer tubular member, and said perforate rim.

14. A device for detecting a leak at the perforation within the rim, from the air cavity of a substantially air tight tire and perforate rim assembly of a tubeless, pneumatic tire, as defined in claim 11; wherein
   (a) said elastomer seal is bonded to said rim within the perforation thereof, in fluid tight relation.

15. A device for detecting a leak at the perforation within the rim, from the air cavity of a substantially air tight tire and perforate rim assembly of a tubeless, pneumatic tire, as defined in claim 14; wherein
   (a) said inner and outer tubular members are fixedly secured together in spaced apart relation to permit passage of air therebetween.

16. A device for detecting a leak at the perforation within the rim, from the air cavity of a substantially air tight tire and perforate rim assembly of a tubeless, pneumatic tire, as defined in claim 11; wherein
   (a) said annular passage, formed between said base of said inner tubular member and the adjacent face of said elastomer seal, contains a ring which surrounds said outer tubular member, and which ring is embedded within said elastomer seal and so formed as to present a void for the passage of air thereinto and into said second lateral passage.

17. A device for detecting a leak at the perforation within the rim, from the air cavity of a substantially air tight tire and perforate rim assembly of a tubless, pneumatic tire, as defined in claim 16; wherein
   (a) said ring is deformed so the faces thereof are non-planar.

18. A device for detecting a leak at the perforation within the rim, from the air cavity of a substantially air tight tire and perforate rim assembly of a tubeless, pneumatic tire, as defined in claim 16; wherein
   (a) said ring is of a cross-section to have a peripheral groove therearound,
      (1) said ring having a further lateral groove formed therein, which groove is in communication with said peripheral groove therein and with said second lateral passage in said outer tubular member.

References Cited

UNITED STATES PATENTS

| | | | |
|---|---|---|---|
| 1,806,380 | 5/1931 | Arnold | 73—146.3 XR |
| 2,784,373 | 3/1957 | Lawrence et al. | 73—49.3 XR |
| 2,915,035 | 12/1959 | Russell | 116—43 |
| 2,948,256 | 8/1960 | Tapp | 73—146.3 XR |
| 2,992,653 | 7/1961 | Patterson. | |
| 3,106,183 | 10/1963 | Schlanger | 116—34 |
| 3,175,390 | 3/1965 | McConkie | 73—49 |

LOUIS R. PRINCE, *Primary Examiner.*

J. NOLTON, *Assistant Examiner.*